US006991023B2

(12) United States Patent
Berchowitz et al.

(10) Patent No.: US 6,991,023 B2
(45) Date of Patent: Jan. 31, 2006

(54) INVOLUTE FOIL REGENERATOR

(75) Inventors: David M. Berchowitz, Athens, OH (US); Neill Lane, Athens, OH (US); Todd Cale, Coolville, OH (US); James Gary Wood, Albany, OH (US)

(73) Assignee: Sunpower, Inc., Athens, OH (US)

( * ) Notice: Subject to any disclaimer, the term of this patent is extended or adjusted under 35 U.S.C. 154(b) by 171 days.

(21) Appl. No.: 10/421,273

(22) Filed: Apr. 24, 2003

(65) Prior Publication Data

US 2004/0211548 A1    Oct. 28, 2004

(51) Int. Cl.
    *F28D 17/00*    (2006.01)
(52) U.S. Cl. ........................................ 165/10; 60/526
(58) Field of Classification Search .................. 165/10
    See application file for complete search history.

(56) References Cited

U.S. PATENT DOCUMENTS

| | | | | |
|---|---|---|---|---|
| 3,463,222 A | * | 8/1969 | Grames | 165/10 |
| 3,875,994 A | * | 4/1975 | Lewakowski et al. | 165/10 |
| 3,999,596 A | * | 12/1976 | Barnard | 165/8 |
| 4,013,117 A | * | 3/1977 | Kopetzki et al. | 165/10 |

FOREIGN PATENT DOCUMENTS

| | | | | |
|---|---|---|---|---|
| GB | 162250 A | * | 5/1927 | 165/10 |
| JP | 2001349247 A | * | 12/2001 | |

* cited by examiner

*Primary Examiner*—Allen J. Flanigan
(74) *Attorney, Agent, or Firm*—Jason H. Foster; Kremblas, Foster, Phillips & Pollick

(57) ABSTRACT

A regenerator having a plurality of involute foils disposed in an annular gap between an inner cylindrical tube and an outer cylindrical tube. The involute shape of the foils provides uniform spacing throughout the entire regenerator and substantial surface area for fluid contact.

11 Claims, 4 Drawing Sheets

INVOLUTE FOIL REGENERATOR

BACKGROUND OF THE INVENTION

1. Field of the Invention

This invention relates generally to thermal regenerators and more particularly to a thermal regenerator that uses thin, planar sheets of material of sufficient thermal conductivity to form the heat transfer surfaces of the regenerator.

2. Description of the Related Art

Many devices, and Stirling cycle machines in particular, include a thermal regenerator to which thermal energy is transferred from a flowing fluid, and from which thermal energy is transferred to the fluid. Regenerators are normally made with large surface area structures, such as wool, foils or spheres, made of metal, such as stainless steel.

In a Stirling cycle engine, for example, a working gas is moved between a warmer space and a cooler space by a reciprocating displacer to drive a reciprocating piston. The gas is heated during one part of the cycle, and cooled during another part. When the warm gas is being transported from the warmer space, it flows through a regenerator, and thermal energy is transferred to the regenerator by convection, i.e., the impingement of heated gas molecules on the regenerator's surfaces. The regenerator is warmed and the gas is cooled when thermal energy is transferred to the regenerator as the gas flows through the regenerator to the cooler space.

Once the gas has been cooled in the cooler space, it is driven again through the regenerator; ordinarily in the opposite direction as when the gas was driven from the warmer space. The cooler gas flowing through the regenerator is warmed by the same convection mechanism by which the gas warmed the regenerator: impingement of gas molecules on the regenerator's surfaces. Regenerators therefore improve the efficiency of the Stirling cycle engine because the gas enters the heated end pre-warmed, and gas enters the cooler end pre-cooled. Of course, regenerators improve the efficiency of many machines other than Stirling cycle machines.

In conventional regenerators, there must be a substantial amount of contact between the flowing fluid molecules and the surfaces of the regenerator in order for substantial heat transfer to occur. One type of regenerator used in Stirling cycle machines uses a long thin strip of metal, such as stainless steel, that is wound up in a roll and placed in a chamber through which gas flows longitudinally of the roll. Each layer of the metal has a space or gap between it and the next adjacent layer for fluid to pass through.

Even though it is desirable to have uniform spacing of the layers of a regenerator, it is often difficult, in practice, to achieve such uniformity of spacing. A temperature differential between the heated end and the cooled end may cause buckling, which varies the gap sizes. Additionally, the flow of fluid through a wound regenerator cannot distribute evenly radially, which can cause areas with substantially more flow to expand or contract the metal more than areas with less flow. All of these problems result in high fluid flow rates through larger gaps, and low flow rates through smaller gaps. Non-uniform flow is disadvantageous, because large gaps permit some gas flowing through the regenerator to make poor contact with the surfaces with which thermal transfer should take place. Furthermore, the pressure drop that is critical to the class of machines referred to as free-piston machines is often compromised with conventional regenerators, thereby resulting in unanticipated dynamic motion of the moving parts.

There is therefore a need for a regenerator that maintains substantially uniform spacing throughout the entire region of the regenerator through which fluid flows.

BRIEF SUMMARY OF THE INVENTION

The invention is a regenerator through which fluid can flow for transferring thermal energy into and out of the fluid. The regenerator comprises an inner wall having a radially outwardly facing cylindrical surface. An outer wall is spaced radially outwardly from the inner wall, and is substantially coaxial with the inner wall. The outer wall has a radially inwardly facing cylindrical surface. An annular gap is thereby formed between the inner wall and the outer wall. A plurality of foils is disposed in the annular gap. The foils extend along substantial involutes of the radially outwardly facing cylindrical surface of the inner wall. Each foil has a first edge mounted to one of the cylindrical surfaces and a second edge spaced from the first edge. The second edge is near the other of said cylindrical surfaces, and is circumferentially displaced from the first edge.

In a preferred embodiment, each foil mounts at its respective inner edge to the radially outwardly facing cylindrical surface of the inner wall, and extends toward, and seats against, the radially inwardly facing cylindrical surface of the outer wall. In a still more preferred embodiment, each foil has at least one spacer disposed between it and each next adjacent foil. The spacers can be tabs or regions of the foil deformed toward the next adjacent foil in the shape of a cup or any other shape.

Figure 1:
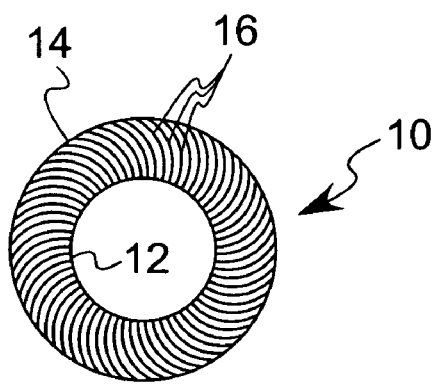
FIG. 1 is a schematic end view illustrating the preferred embodiment of the present invention.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or term similar thereto are often used. They are not limited to direct connection, but include connection through other elements where such connection is recognized as being equivalent by those skilled in the art.

DETAILED DESCRIPTION OF THE INVENTION

Figure 2:
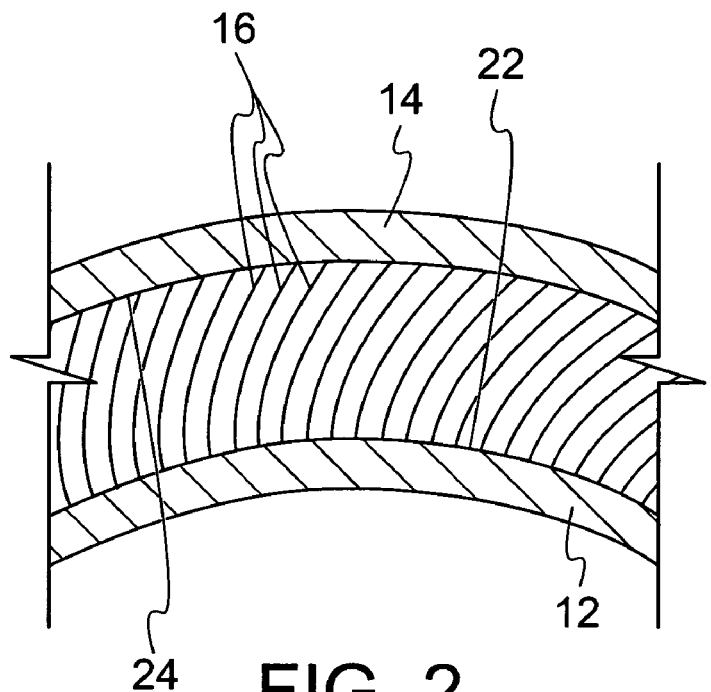
FIG. 2 is an end view in section illustrating the preferred embodiment of the present invention.
Figure 13:
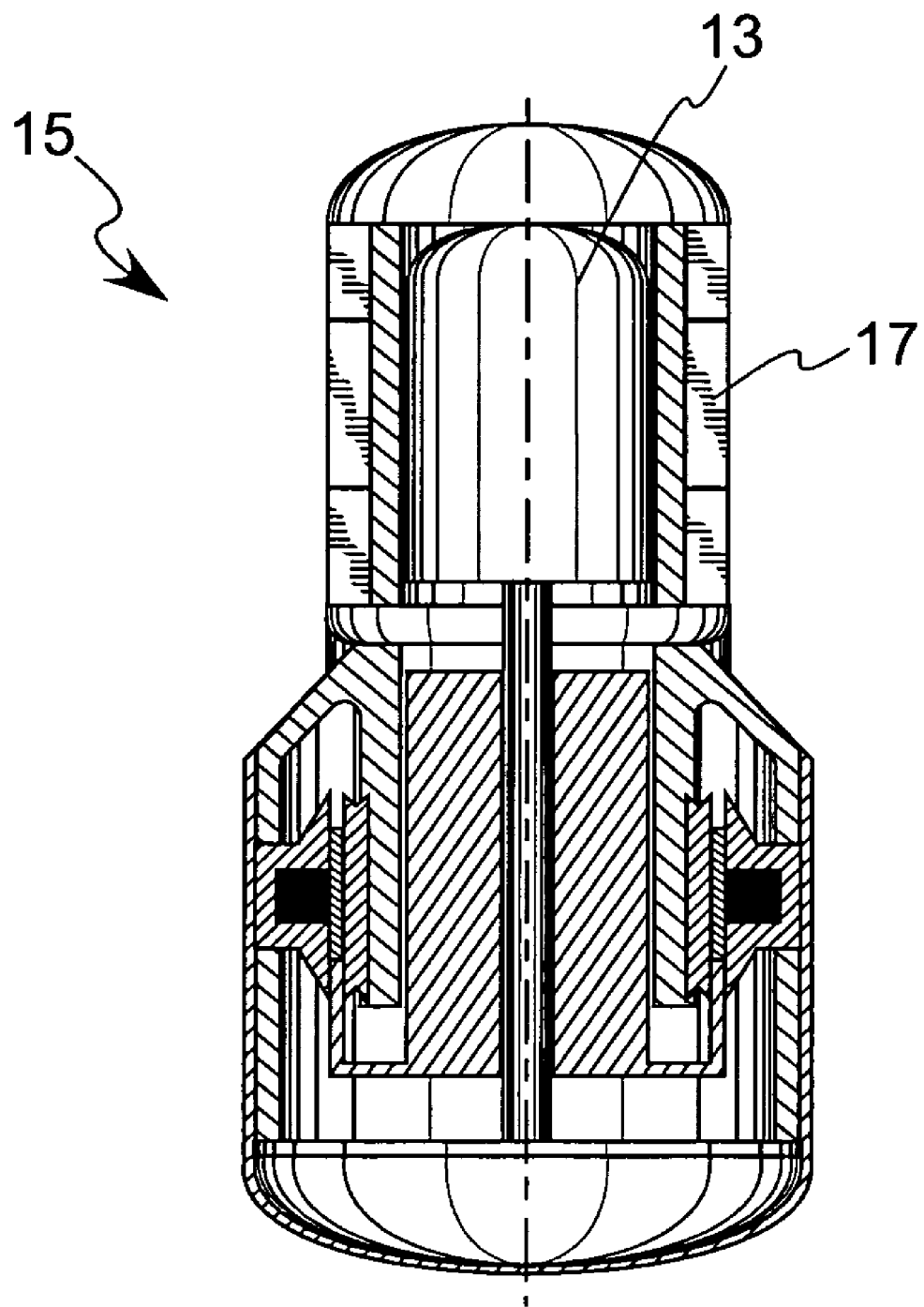
FIG. 13 is a schematic side view illustrating the placement of a regenerator on a Stirling cycle machine.

The preferred embodiment of the regenerator 10 is shown in FIG. 1, having an inner cylindrical wall 12 and an outer cylindrical wall 14. The inner wall is, in a preferred embodiment, a wall within which the displacer 13 of a Stirling cycle machine 15 reciprocates, as shown in FIG. 13. In a preferred embodiment, the outer wall 14 is coaxial with the inner wall 12, and both the inner and outer walls are circular cylinders as shown in FIG. 2.

There is a gap formed between the radially outwardly facing cylindrical surface 22 of the inner wall 12 and the radially inwardly facing surface 24 of the outer wall 14. The gap is preferably annular, and extends a substantial portion, and preferably essentially the entirety, of the length of the inner and outer walls 12 and 14. In the contemplated Stirling cycle machine 15, a fluid, such as the working gas, flows through the annular gap 17 in a manner that will be apparent to those skilled in the Stirling cycle machine art and conventional regenerators.

There are many foils 16 positioned in the annular gap between the inner and outer walls 12 and 14. The foils 16 are made of a material to and from which thermal energy is readily transferred, but which does not have a high thermal conductivity that causes it to rapidly conduct the thermal energy to the surrounding structure. Stainless steel is a preferred material for the foils 16 used with engines (prime movers), and polyester or a similar plastic is preferred for coolers (heat pumps). The foils preferably have a length and width that is substantially greater than their thickness. For example, a contemplated foil has a length of 60 mm, a width of 13.67 mm and a thickness of 0.0254 mm. These dimensions are only exemplary, and it will be understood that the dimensions can vary significantly. For example, the width of a foil is determined by the distance across the annular gap, the angle of the attached edge, and other factors that cause the foil to form an involute.

Each of the foils 16 is mounted to the radially outwardly facing surface 22 at its inner edge at spaced intervals of equal width, and each extends along a path that is a substantial involute of the surface 22 to contact the inwardly facing surface 24. The outer edges of the foils can be welded, adhered or otherwise seated against the surface 24, but this is not required. The outer edges can be left free so that they seat against the inwardly facing surface 24 and cause slight compression of the foil regenerator structure. In this configuration, the regenerator conforms to accommodate the differential expansions that occur when using different materials for the foils and the walls 12 and 14, such as plastic foils and metal walls.

By lying along an involute of the radially outwardly facing surface 22, and being spaced at equal intervals around the cylindrical surface 22, each foil 16 maintains a constant spacing relative to its nearest neighbor along the entire length and width of each foil. Thus, there is a uniform spacing between each of the foils 16 at all radial and longitudinal positions, so that gas flowing through the annular gap does not have any larger pathways to flow preferentially through. This uniform flow prevents "hot spots", and, likewise, "cold spots", from reducing the effect of the regenerator 10 on the efficiency of the machine to which it is mounted.

Figure 3:
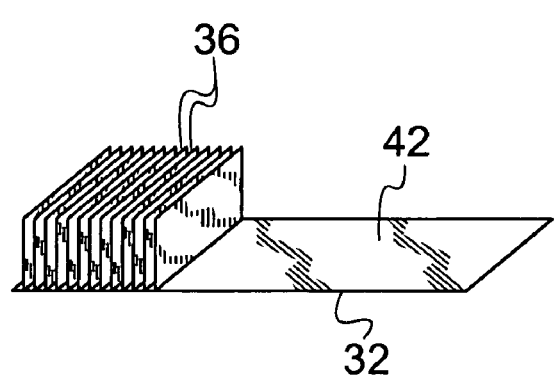
FIG. 3 is a view in perspective illustrating the present invention in an intermediate state of manufacture with the foils in a substantially planar orientation and at substantial right angles relative to a wall to which they are mounted.

The regenerator 10 can be manufactured by one of several methods. In a preferred method, a substantially planar wall 32 has a plurality of substantially parallel planar foils 36, each of which is attached at a foil edge along the wall's 32 major surface 42, preferably by welding, brazing or soldering when using metal foils and walls, or hot-melting, solvent bonding, ultrasonic welding or other plastic bonding technique when the materials are plastic. Each foil's edge is mounted substantially perpendicular to the wall 32 equally spaced from each adjacent foil by, for example, 0.115 mm for foils that are 0.0254 mm thick. Once all of the foils are attached, the structure has the appearance of a book when viewed along the planes of the foils 36 and the wall 32 as shown in FIG. 3. Each of the foils is a "page" of the "book", and the "spine" is the wall 32.

Figure 4:
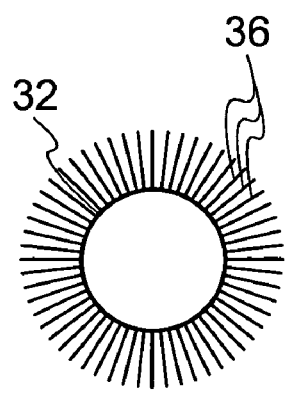
FIG. 4 is an end view illustrating the present invention in an intermediate state of manufacture.
Figure 5:
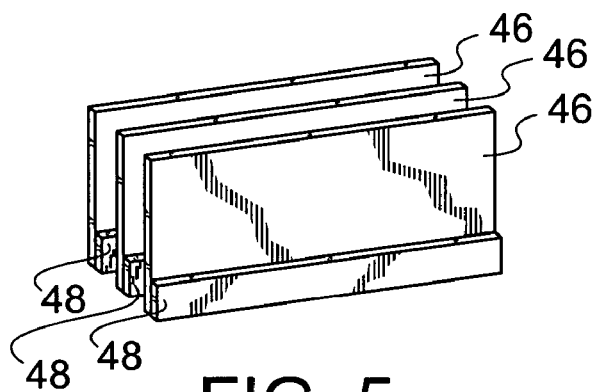
FIG. 5 is a view in perspective illustrating the present invention in an intermediate state of manufacture.

Once the foils 36 are all mounted to the wall 32, the wall 32 is deformed, preferably by bending it around (away from the foils 36) to form a circular cylinder as shown in FIG. 4. The wall could be bent into a rectangular cylinder or any other shape desired. The opposite edges of the wall 32 are connected together, such as by welding, to retain the previously planar wall 32 in the circular cylindrical shape to which it is bent. Each of the foils 36 retains its substantially planar shape, and is oriented radially of the wall 32.

The space between each of the foils 36 in the configuration shown in FIG. 4 is pie-shaped, because it increases in width as a function of the radial distance from the wall 32. If the regenerator were to be assembled in this configuration, the non-uniform gaps would permit most of the gas to flow through the widest regions of the gaps between the foils 36, at the greatest radial distance from the wall 32, because the resistance to fluid flow is least there.

Instead of assembling the regenerator when the foils are in the FIG. 4 configuration, the entire structure is next placed in a diameter-reducing device, such as a person's hand, a funnel-shaped tube or another device, while at the same time rotating the wall 32 in one direction. The outer edges of the foils 36 seat against the surface of the diameter-reducing device during the rotation of the wall 32, and due to frictional resistance at the tips of the foils, all of the foils 36 bend in one circumferential direction, such as clockwise as the radially innermost edges rotate with the wall 32 and the radially outermost edges stay seated against the device used to reduce the diameter of the foil 36 and wall 32 combination. As all of the foils bend in the same circumferential direction and the diameter of the diameter-reducing device decreases, the foils begin to form substantial involutes of the wall 32. When this occurs, the outer edges of the foils 36 are closer to the wall 32, which permits the combination of the wall 32 and the foils 36 to be inserted into an outer cylindrical wall against which the outer edges of the bent foils seat. The outer wall into which the wall 32 and foils 36 is inserted has an inwardly facing cylindrical surface that is closer to the radially outwardly facing surface 42 than the outer edges of the foils 36 prior to bending. The final structure is structurally identical to that shown schematically in FIG. 1.

It also is possible to form a regenerator according to the present invention by first attaching a plurality of parallel foils to a wall at an angle to the wall that approaches zero degrees. The wall is then bent in the direction opposite that shown in FIG. 4 to form a cylindrical outer wall, so that the foils extend inwardly of the wall. Then a tube is inserted within the outer wall after the foils are all rotated in the same circumferential direction and their inner edges are attached to the tube, which serves as the inner wall to form a regenerator. In this embodiment, the foils are attached at substantial right angles to the inner wall and curve outwardly along involutes toward the outer wall, intersecting the outer wall at the angle at which they were attached.

Figure 6:
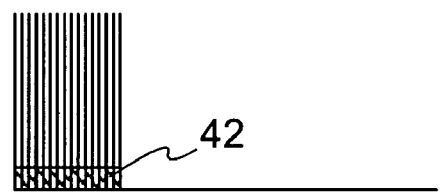
FIG. 6 is a schematic end view illustrating an alternative embodiment of the present invention in an intermediate state of manufacture.

Another method of making the regenerator according to the present invention is to align a plurality of foils 46 parallel to one another in a "stack." The spacers 48, which are preferably made of a similar or identical material to the foils, but much shorter than the foils 46, are interposed between each pair of foils 46 near the inner edges of the foils 46. Next the stack of foils 46 is packed together in a tight relationship with the spacers 48 all aligned near the inner edge of the foils 46. Heat is then applied to the inner edge of the foils 46 and the spacers 48. The spacers 48 and foils 46 become hot enough to melt slightly at the inner edge, and then they are cooled, causing solidification, which forms a thin wall 42 at the inner edge as shown in FIG. 6. The heat can be applied along parallel lines perpendicular to the foils, and may be accompanied by a meltable rod, so as to weld the foils and spacers together. Once the thin wall 42 is formed, it is then bent into a cylinder, or bent around and attached to a cylinder, the foils 46 are rotated circumferentially in the same direction and the entire device is placed in a cylindrical outer wall as in the method described in association with FIGS. 3 and 4.

Figure 7:
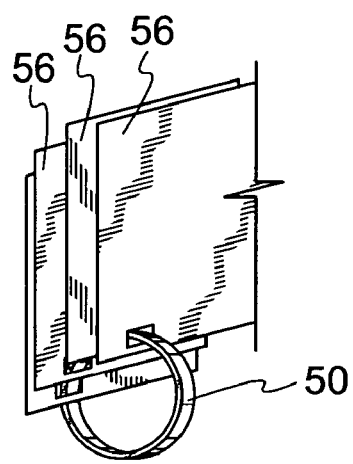
FIG. 7 is a view in perspective illustrating an alternative embodiment of the present invention using rings extending through apertures in the foils in which thicknesses are exaggerated to emphasize relative surfaces.

Another alternative method of making a regenerator according to the present invention is to insert one or more rings such as the stainless steel ring 50 shown in FIG. 7, through a plurality of aligned apertures formed near one edge of each of the foils 56. The ring 50 has overlapping ends to prevent foils from sliding off the ring 50. Spacers, such as shorter foils, can also be placed on the rings to space the foils. Once all of the foils 56 are placed on the ring 50 by spreading the ends of the ring, the ring 50 springs closed and a circular cylinder shaped tube is inserted within the ring 50 until the inwardly facing edges of the foils 56 seat against the radially outwardly facing surface of the tube wall. Then the foils can be attached to the tube, bent circumferentially in the same direction, and then the entire structure is inserted into a second tube. Alternatively, the foils and spacers can be heated to form a wall as in the embodiment described in association with FIG. 6.

Figure 8:
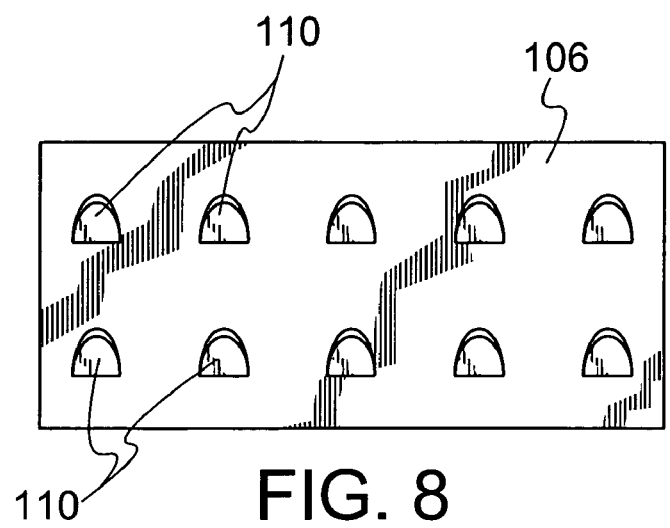
FIG. 8 is a side view illustrating a foil with one embodiment of spacers.
Figure 9:
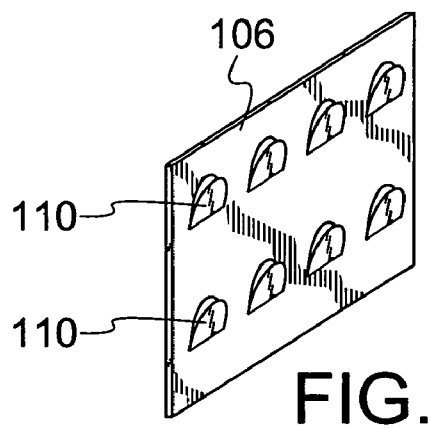
FIG. 9 is a view in perspective illustrating the foil of FIG. 8 with its spacers in which thicknesses are exaggerated.
Figure 10:
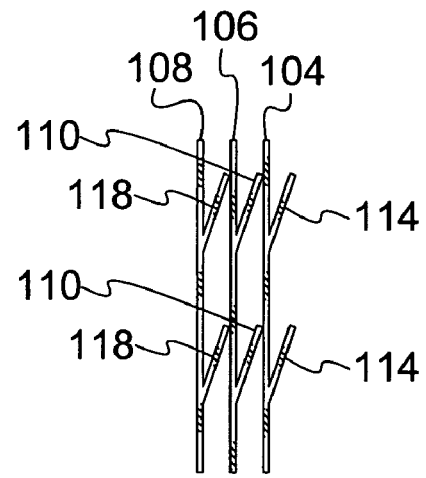
FIG. 10 is an end view illustrating the foil of FIG. 8 in an operable position relative to other foils in which thicknesses are exaggerated.

Each of the foils of the regenerator of the instant invention can have a spacer structure that mechanically maintains its spacing relative to each next adjacent foil. In one embodiment shown in FIG. 8, a foil 106 has tabs 110 that serve as spacers. Each tab 110 is formed by cutting the foil 106 along a U-shaped curve, and then pushing the free end of the portion of the foil 106 that is within the U-shaped curve to one side along a path transverse to the plane that contains the foil 106 as shown in FIGS. 9 and 10. In FIG. 10, the foil 106 is shown with its tabs 110 functioning as spacers by seating against a next adjacent foil 104. The foil 108 has tabs 118 seating against the foil 106.

Figure 11:
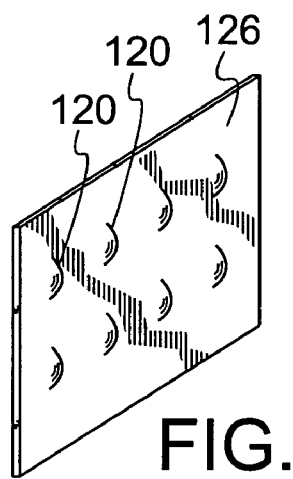
FIG. 11 is a view in perspective illustrating an alternative foil and another embodiment of spacers in which thicknesses are exaggerated.
Figure 12:
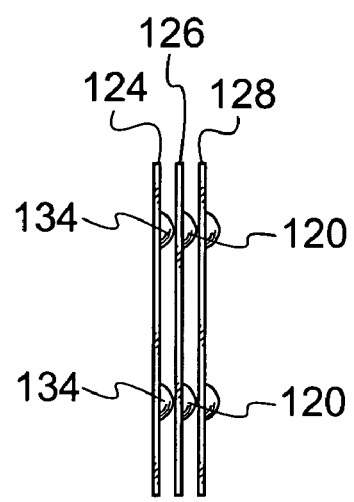
FIG. 12 is an end view illustrating the foil of FIG. 11 in an operable position relative to other similar foils in which thicknesses are exaggerated.

In an alternative embodiment shown in FIGS. 11 and 12, the spacers are bumps 120 formed in the foil 126. The bumps 120 can be formed by plastically deforming the foil 126, such as by forcing the foil into a recess with a molded instrument, thereby stretching the foil locally. The tips of each of the bumps 120 seat against the next adjacent foil 128, and the bumps 134 of the other adjacent foil 124 seat against the foil 126.

A regenerator made according to the instant invention may be placed in an environment where a fluid, such as a liquid or a gas, flows through it longitudinally in one direction during one part of a cycle, and then flows through it longitudinally in an opposite direction during another part of the cycle. In a preferred embodiment, the regenerator is mounted in a Stirling cycle machine with its inner and outer cylindrical walls tack welded or otherwise rigidly connected to adjacent cylindrical structures as shown in FIG. 13. The longitudinal ends of each foil are supported against longitudinal and circumferential movement by tack welding or by compressing metal wool (in the case of engines) or plastic foam (in the case of heat pumps) between the longitudinal ends of the foils and the adjacent structure. The wool or foam restricts the foils, and thereby resists any movement of the regenerator or its components as the fluid is displaced rapidly first in one direction and then in the opposite direction. The wool or foam can serve some regenerating purpose, but most importantly acts as a mechanical stop to prevent circumferential movement of the foils or longitudinal movement of the entire structure or any component parts.

While certain preferred embodiments of the present invention have been disclosed in detail, it is to be understood that various modifications may be adopted without departing from the spirit of the invention or scope of the following claims.

What is claimed is:

1. A regenerator through which fluid can flow for transferring thermal energy into and out of the fluid, the regenerator comprising:
   a) an inner wall having a radially outwardly facing cylindrical surface;
   b) an outer wall substantially coaxial with the inner wall and spaced radially outwardly therefrom forming an annular gap between the inner wall and the outer wall, said outer wall having a radially inwardly facing cylindrical surface;
   c) a plurality of foils in the annular gap extending along substantial involutes of the radially outwardly facing cylindrical surface, each foil having an inner edge mounted to the radially outwardly facing cylindrical surface of the inner wall at substantially equal circumferentially spaced intervals and an outer edge spaced from the inner edge, the outer edge being circumferentially displaced from the inner edge and extending toward the radially inwardly facing cylindrical surface of the outer wall; wherein a plurality of longitudinal gaps, each longitudinal gap being formed between one of the foils and its respective next adjacent foil, extends from the inner wall to the outer wall, the longitudinal gaps forming involute flow passages that extend substantially uninterrupted between the inner and outer walls.

2. The regenerator in accordance with claim 1, wherein a gap width of each longitudinal gap is substantially the same at all radial distances from the radially outwardly facing cylindrical surface of the inner wall.

3. The regenerator in accordance with claim 2, further comprising a plurality of spacers, each spacer being mounted within one of said longitudinal gaps and insubstantially interrupting the corresponding involute flow passage.

4. The regenerator in accordance with claim 3, wherein each spacer is a tab mounted to one of the foils.

5. The regenerator in accordance with claim 4, wherein each tab is formed from a portion of each respective foil deformed toward the next adjacent foil.

6. The regenerator in accordance with claim 5, further comprising a curved incision in each foil surrounding at least part of each tab.

7. The regenerator in accordance with claim 6, wherein the cylindrical surfaces are circular cylindrical surfaces.

8. A regenerator through which fluid can flow for transferring thermal energy into and out of the fluid, the regenerator comprising:
   a) an inner wall having a radially outwardly facing cylindrical surface;
   b) an outer wall substantially coaxial with the inner wall and spaced radially outwardly therefrom forming an annular gap between the inner wall and the outer wall, said outer wall having a radially inwardly facing cylindrical surface;
   c) a plurality of foils in the annular gap extending along substantial involutes of the radially inwardly facing cylindrical surface, each foil having an outer edge mounted to the radially inwardly facing cylindrical surface of the outer wall at substantially equal circumferentially spaced intervals and an inner edge spaced from the outer edge, the inner edge being circumferentially displaced from the outer edge and extending toward the radially outwardly facing cylindrical surface of the inner wall;

wherein a plurality of longitudinal gaps, each longitudinal gap being formed between one of the foils and its respective next adjacent foil, extends from the inner wall to the outer wall, the longitudinal gaps forming involute flow passages that extend substantially uninterrupted between the inner and outer walls.

9. The regenerator in accordance with claim 8, wherein a gap width of each longitudinal gap is substantially the same at all radial distances from the radially outwardly facing cylindrical surface of the inner wall.

10. The regenerator in accordance with claim 9, further comprising a plurality of spacers, each spacer being mounted within one of said longitudinal gaps and insubstantially interrupting the corresponding involute flow passage.

11. The regenerator in accordance with claim 10, wherein each spacer is a tab mounted to one of the foils.

* * * * *